(12) United States Patent
Tyler et al.

(10) Patent No.: US 10,940,638 B2
(45) Date of Patent: Mar. 9, 2021

(54) ADDITIVE MANUFACTURING SYSTEM HAVING FINISH-FOLLOWER

(71) Applicant: CC3D LLC, Coeur d'Alene, ID (US)

(72) Inventors: Kenneth Lyle Tyler, Coeur d'Alene, ID (US); Ryan C Stockett, Lebanon, NH (US)

(73) Assignee: Continuous Composites inc., Coeur d'Alene, ID (US)

(*) Notice: Subject to any disclaimer, the term of this patent is extended or adjusted under 35 U.S.C. 154(b) by 340 days.

(21) Appl. No.: 15/846,490

(22) Filed: Dec. 19, 2017

(65) Prior Publication Data

US 2018/0207870 A1    Jul. 26, 2018

Related U.S. Application Data

(60) Provisional application No. 62/449,899, filed on Jan. 24, 2017.

(51) Int. Cl.
*B29C 64/118* (2017.01)
*B29C 64/165* (2017.01)
(Continued)

(52) U.S. Cl.
CPC ............ *B29C 64/118* (2017.08); *B29C 48/05* (2019.02); *B29C 48/08* (2019.02); *B29C 48/12* (2019.02);
(Continued)

(58) Field of Classification Search
None
See application file for complete search history.

(56) References Cited

U.S. PATENT DOCUMENTS 3,286,305 A    11/1966    Seckel
3,809,514 A    5/1974    Nunez
(Continued)

FOREIGN PATENT DOCUMENTS

DE    4102257 A1    7/1992
DE    102012210203 A1    12/2013
(Continued)

OTHER PUBLICATIONS

A. Di. Pietro & Paul Compston, Resin Hardness and Interlaminar Shear Strength of a Glass-Fibre/Vinylester Composite Cured with High Intensity Ultraviolet (UV) Light, Journai of Materials Science, vol. 44, pp. 4188-4190 (Apr. 2009).
(Continued)

*Primary Examiner* — Joseph S Del Sole
*Assistant Examiner* — Manley L Cummins, IV
(74) *Attorney, Agent, or Firm* — Ryan Stockett

(57) ABSTRACT

An additive manufacturing system is disclosed. The additive manufacturing system may include a matrix reservoir, a primary nozzle fluidly connected to the matrix reservoir, and a primary cure enhancer operatively connected to at least one of the matrix reservoir and the primary nozzle. The primary cure enhancer may be configured to direct a cure energy toward a tip of the primary nozzle. The additive manufacturing system may also include an auxiliary nozzle, an arm configured to mount the auxiliary nozzle at a trailing side of the primary nozzle, and a passage extending from the matrix reservoir to the auxiliary nozzle.

18 Claims, 2 Drawing Sheets

(51) Int. Cl.

| | | |
|---|---|---|
| B29C 64/135 | (2017.01) | |
| B29C 64/209 | (2017.01) | |
| B33Y 10/00 | (2015.01) | |
| B33Y 30/00 | (2015.01) | |
| B29C 64/371 | (2017.01) | |
| B29C 48/08 | (2019.01) | |
| B29C 48/35 | (2019.01) | |
| B29C 48/305 | (2019.01) | |
| B29C 64/245 | (2017.01) | |
| B29C 64/124 | (2017.01) | |
| B29C 70/24 | (2006.01) | |
| B29C 70/38 | (2006.01) | |
| B29C 64/129 | (2017.01) | |
| B29C 70/68 | (2006.01) | |
| B29C 48/12 | (2019.01) | |
| B29C 48/05 | (2019.01) | |
| B29C 64/386 | (2017.01) | |
| B29C 64/277 | (2017.01) | |
| B33Y 70/10 | (2020.01) | |
| B29C 64/282 | (2017.01) | |
| B33Y 40/20 | (2020.01) | |
| B29C 48/30 | (2019.01) | |
| B33Y 50/02 | (2015.01) | |
| B33Y 70/00 | (2020.01) | |
| B29C 64/214 | (2017.01) | |
| B29C 64/264 | (2017.01) | |
| B29C 64/393 | (2017.01) | |
| B29C 64/106 | (2017.01) | |
| B29C 64/336 | (2017.01) | |
| B29C 70/06 | (2006.01) | |
| B29C 64/218 | (2017.01) | |
| B29K 105/10 | (2006.01) | |
| B29K 105/00 | (2006.01) | |
| B22F 7/06 | (2006.01) | |
| B22F 3/00 | (2021.01) | |
| B29C 33/00 | (2006.01) | |
| B33Y 80/00 | (2015.01) | |
| B22F 3/10 | (2006.01) | |
| B22F 3/11 | (2006.01) | |
| B29C 64/227 | (2017.01) | |
| B29K 105/08 | (2006.01) | |
| B33Y 40/00 | (2020.01) | |
| B29B 15/12 | (2006.01) | |

(52) U.S. Cl.
CPC ............ *B29C 48/30* (2019.02); *B29C 48/305* (2019.02); *B29C 48/35* (2019.02); *B29C 64/106* (2017.08); *B29C 64/124* (2017.08); *B29C 64/129* (2017.08); *B29C 64/135* (2017.08); *B29C 64/165* (2017.08); *B29C 64/209* (2017.08); *B29C 64/214* (2017.08); *B29C 64/218* (2017.08); *B29C 64/245* (2017.08); *B29C 64/264* (2017.08); *B29C 64/277* (2017.08); *B29C 64/282* (2017.08); *B29C 64/336* (2017.08); *B29C 64/371* (2017.08); *B29C 64/386* (2017.08); *B29C 64/393* (2017.08); *B29C 70/06* (2013.01); *B29C 70/24* (2013.01); *B29C 70/382* (2013.01); *B29C 70/384* (2013.01); *B29C 70/683* (2013.01); *B33Y 10/00* (2014.12); *B33Y 30/00* (2014.12); *B33Y 40/20* (2020.01); *B33Y 50/02* (2014.12); *B33Y 70/00* (2014.12); *B33Y 70/10* (2020.01); *B22F 3/008* (2013.01); *B22F 3/1035* (2013.01); *B22F 3/1118* (2013.01); *B22F 7/06* (2013.01); *B22F 2999/00* (2013.01); *B29B 15/122* (2013.01); *B29C 64/227* (2017.08); *B29C 2033/0005* (2013.01); *B29K 2105/0058* (2013.01); *B29K 2105/08* (2013.01); *B29K 2105/101* (2013.01); *B33Y 40/00* (2014.12); *B33Y 80/00* (2014.12)

(56) References Cited

U.S. PATENT DOCUMENTS

| | | | |
|---|---|---|---|
| 3,984,271 | A | 10/1976 | Gilbu |
| 3,993,726 | A | 11/1976 | Moyer |
| 4,643,940 | A | 2/1987 | Shaw et al. |
| 4,671,761 | A | 6/1987 | Adrian et al. |
| 4,749,347 | A * | 6/1988 | Valavaara ............... G05B 19/41 425/135 |
| 4,822,548 | A | 4/1989 | Hempel |
| 4,851,065 | A | 7/1989 | Curtz |
| 5,002,712 | A | 3/1991 | Goldmann et al. |
| 5,037,691 | A | 8/1991 | Medney et al. |
| 5,296,335 | A | 3/1994 | Thomas et al. |
| 5,340,433 | A | 8/1994 | Crump |
| 5,746,967 | A | 5/1998 | Hoy et al. |
| 5,866,058 | A | 2/1999 | Batchelder et al. |
| 5,936,861 | A | 8/1999 | Jang et al. |
| 6,153,034 | A | 11/2000 | Lipsker |
| 6,372,178 | B1 * | 4/2002 | Tseng ..................... B29C 41/12 264/656 |
| 6,459,069 | B1 | 10/2002 | Rabinovich |
| 6,501,554 | B1 | 12/2002 | Hackney et al. |
| 6,799,081 | B1 | 9/2004 | Hale et al. |
| 6,803,003 | B2 | 10/2004 | Rigali et al. |
| 6,934,600 | B2 | 8/2005 | Jang et al. |
| 7,039,485 | B2 | 5/2006 | Engelbart et al. |
| 7,555,404 | B2 | 6/2009 | Brennan et al. |
| 7,795,349 | B2 | 9/2010 | Bredt et al. |
| 8,221,669 | B2 | 7/2012 | Batchelder et al. |
| 8,962,717 | B2 | 2/2015 | Roth et al. |
| 9,126,364 | B2 * | 9/2015 | Ki ........................... B21D 5/04 |
| 9,126,365 | B1 | 9/2015 | Mark et al. |
| 9,126,367 | B1 | 9/2015 | Mark et al. |
| 9,149,988 | B2 | 10/2015 | Mark et al. |
| 9,156,205 | B2 | 10/2015 | Mark et al. |
| 9,186,846 | B1 | 11/2015 | Mark et al. |
| 9,186,848 | B2 | 11/2015 | Mark et al. |
| 9,327,452 | B2 | 5/2016 | Mark et al. |
| 9,327,453 | B2 | 5/2016 | Mark et al. |
| 9,370,896 | B2 | 6/2016 | Mark |
| 9,381,702 | B2 | 7/2016 | Hollander |
| 9,457,521 | B2 | 10/2016 | Johnston et al. |
| 9,458,955 | B2 | 10/2016 | Hammer et al. |
| 9,527,248 | B2 | 12/2016 | Hollander |
| 9,539,762 | B2 | 1/2017 | Durand et al. |
| 9,579,851 | B2 | 2/2017 | Mark et al. |
| 9,688,028 | B2 | 6/2017 | Mark et al. |
| 9,694,544 | B2 | 7/2017 | Mark et al. |
| 9,764,378 | B2 | 9/2017 | Peters et al. |
| 9,770,876 | B2 | 9/2017 | Farmer et al. |
| 9,782,926 | B2 | 10/2017 | Witzel et al. |
| 10,254,499 | B1 * | 4/2019 | Cohen .................... B33Y 70/00 |
| 2002/0009935 | A1 | 1/2002 | Hsiao et al. |
| 2002/0062909 | A1 | 5/2002 | Jang et al. |
| 2002/0113331 | A1 | 8/2002 | Zhang et al. |
| 2002/0165304 | A1 | 11/2002 | Mulligan et al. |
| 2003/0044539 | A1 | 3/2003 | Oswald |
| 2003/0056870 | A1 | 3/2003 | Comb et al. |
| 2003/0160970 | A1 | 8/2003 | Basu et al. |
| 2003/0186042 | A1 | 10/2003 | Dunlap et al. |
| 2003/0236588 | A1 | 12/2003 | Jang et al. |
| 2005/0006803 | A1 | 1/2005 | Owens |
| 2005/0061422 | A1 | 3/2005 | Martin |
| 2005/0104248 | A1 * | 5/2005 | Younie ................ B29C 33/3821 264/219 |
| 2005/0104257 | A1 | 5/2005 | Gu et al. |
| 2005/0109451 | A1 | 5/2005 | Hauber et al. |
| 2005/0230029 | A1 | 10/2005 | Vaidyanathan et al. |
| 2007/0003650 | A1 | 1/2007 | Schroeder |
| 2007/0228592 | A1 | 10/2007 | Dunn et al. |

(56) References Cited

U.S. PATENT DOCUMENTS

| | | |
|---|---|---|
| 2008/0176092 A1 | 7/2008 | Owens |
| 2009/0095410 A1 | 4/2009 | Oldani |
| 2009/0199948 A1* | 8/2009 | Kisch .................... B29C 70/38 156/64 |
| 2010/0257792 A1* | 10/2010 | Khoshnevis ............ B29C 48/09 52/27 |
| 2011/0032301 A1 | 2/2011 | Fienup et al. |
| 2011/0143108 A1 | 6/2011 | Fruth et al. |
| 2012/0060468 A1 | 3/2012 | Dushku et al. |
| 2012/0159785 A1 | 6/2012 | Pyles et al. |
| 2012/0231225 A1 | 9/2012 | Mikulak et al. |
| 2012/0247655 A1 | 10/2012 | Erb et al. |
| 2013/0164498 A1 | 6/2013 | Langone et al. |
| 2013/0209600 A1 | 8/2013 | Tow |
| 2013/0233471 A1 | 9/2013 | Kappesser et al. |
| 2013/0292039 A1 | 11/2013 | Peters et al. |
| 2013/0337256 A1 | 12/2013 | Farmer et al. |
| 2013/0337265 A1 | 12/2013 | Farmer |
| 2014/0034214 A1 | 2/2014 | Boyer et al. |
| 2014/0061974 A1 | 3/2014 | Tyler |
| 2014/0159284 A1 | 6/2014 | Leavitt |
| 2014/0232035 A1 | 8/2014 | Bheda |
| 2014/0268604 A1 | 9/2014 | Wicker et al. |
| 2014/0291886 A1 | 10/2014 | Mark et al. |
| 2015/0048553 A1* | 2/2015 | Dietrich ................. B33Y 40/00 264/401 |
| 2015/0118402 A1* | 4/2015 | Fuerst .................... B29B 15/122 427/358 |
| 2015/0136455 A1 | 5/2015 | Fleming |
| 2015/0140147 A1 | 5/2015 | Konstantinos et al. |
| 2015/0306823 A1* | 10/2015 | Askedall ............... B29C 64/106 425/131.1 |
| 2015/0375457 A1 | 12/2015 | Mark et al. |
| 2016/0012935 A1 | 1/2016 | Rothfuss |
| 2016/0031155 A1 | 2/2016 | Tyler |
| 2016/0046082 A1 | 2/2016 | Fuerstenberg |
| 2016/0052208 A1 | 2/2016 | Debora et al. |
| 2016/0082641 A1 | 3/2016 | Bogucki et al. |
| 2016/0082659 A1 | 3/2016 | Hickman et al. |
| 2016/0107379 A1 | 4/2016 | Mark et al. |
| 2016/0114532 A1 | 4/2016 | Schirtzinger et al. |
| 2016/0136885 A1 | 5/2016 | Nielsen-Cole et al. |
| 2016/0144565 A1 | 5/2016 | Mark et al. |
| 2016/0144566 A1 | 5/2016 | Mark et al. |
| 2016/0192741 A1 | 7/2016 | Mark |
| 2016/0200047 A1 | 7/2016 | Mark et al. |
| 2016/0243762 A1 | 8/2016 | Fleming et al. |
| 2016/0263806 A1 | 9/2016 | Gardiner |
| 2016/0263822 A1 | 9/2016 | Boyd |
| 2016/0263823 A1 | 9/2016 | Espiau et al. |
| 2016/0271367 A1* | 9/2016 | Hyde .................... A61L 27/3633 |
| 2016/0271876 A1 | 9/2016 | Lower |
| 2016/0297104 A1 | 10/2016 | Guillemette et al. |
| 2016/0311165 A1 | 10/2016 | Mark et al. |
| 2016/0325491 A1 | 11/2016 | Sweeney et al. |
| 2016/0332369 A1 | 11/2016 | Shah et al. |
| 2016/0339633 A1 | 11/2016 | Stolyarov et al. |
| 2016/0346998 A1 | 12/2016 | Mark et al. |
| 2016/0361868 A1* | 12/2016 | Wang .................... B29C 70/545 |
| 2016/0361869 A1 | 12/2016 | Mark et al. |
| 2016/0361873 A1 | 12/2016 | Maier |
| 2016/0368213 A1 | 12/2016 | Mark |
| 2016/0368255 A1 | 12/2016 | Witte et al. |
| 2017/0007359 A1 | 1/2017 | Kopelman et al. |
| 2017/0007360 A1 | 1/2017 | Kopelman et al. |
| 2017/0007361 A1 | 1/2017 | Boronkay et al. |
| 2017/0007362 A1 | 1/2017 | Chen et al. |
| 2017/0007363 A1 | 1/2017 | Boronkay |
| 2017/0007365 A1 | 1/2017 | Kopelman et al. |
| 2017/0007366 A1 | 1/2017 | Kopelman et al. |
| 2017/0007367 A1 | 1/2017 | Li et al. |
| 2017/0007368 A1 | 1/2017 | Boronkay |
| 2017/0007386 A1 | 1/2017 | Mason et al. |
| 2017/0008333 A1 | 1/2017 | Mason et al. |
| 2017/0015059 A1 | 1/2017 | Lewicki |
| 2017/0015060 A1 | 1/2017 | Lewicki et al. |
| 2017/0021565 A1 | 1/2017 | Deaville |
| 2017/0028434 A1 | 2/2017 | Evans et al. |
| 2017/0028588 A1 | 2/2017 | Evans et al. |
| 2017/0028617 A1 | 2/2017 | Evans et al. |
| 2017/0028619 A1 | 2/2017 | Evans et al. |
| 2017/0028620 A1 | 2/2017 | Evans et al. |
| 2017/0028621 A1 | 2/2017 | Evans et al. |
| 2017/0028623 A1 | 2/2017 | Evans et al. |
| 2017/0028624 A1 | 2/2017 | Evans et al. |
| 2017/0028625 A1 | 2/2017 | Evans et al. |
| 2017/0028627 A1 | 2/2017 | Evans et al. |
| 2017/0028628 A1 | 2/2017 | Evans et al. |
| 2017/0028633 A1 | 2/2017 | Evans et al. |
| 2017/0028634 A1 | 2/2017 | Evans et al. |
| 2017/0028635 A1 | 2/2017 | Evans et al. |
| 2017/0028636 A1 | 2/2017 | Evans et al. |
| 2017/0028637 A1 | 2/2017 | Evans et al. |
| 2017/0028638 A1 | 2/2017 | Evans et al. |
| 2017/0028639 A1 | 2/2017 | Evans et al. |
| 2017/0028640 A1* | 2/2017 | Harrison ................ B29C 69/001 |
| 2017/0028644 A1 | 2/2017 | Evans et al. |
| 2017/0030207 A1 | 2/2017 | Kittleson |
| 2017/0036403 A1 | 2/2017 | Ruff et al. |
| 2017/0050340 A1 | 2/2017 | Hollander |
| 2017/0057164 A1 | 3/2017 | Hemphill et al. |
| 2017/0057165 A1 | 3/2017 | Waldrop et al. |
| 2017/0057167 A1 | 3/2017 | Tooren et al. |
| 2017/0057181 A1 | 3/2017 | Waldrop et al. |
| 2017/0064840 A1 | 3/2017 | Espalin et al. |
| 2017/0066187 A1 | 3/2017 | Mark et al. |
| 2017/0087768 A1 | 3/2017 | Bheda |
| 2017/0106565 A1 | 4/2017 | Braley et al. |
| 2017/0106594 A1* | 4/2017 | Gardiner ............... B29C 64/277 |
| 2017/0120519 A1 | 5/2017 | Mark |
| 2017/0129170 A1 | 5/2017 | Kim et al. |
| 2017/0129171 A1 | 5/2017 | Gardner et al. |
| 2017/0129176 A1 | 5/2017 | Waatti et al. |
| 2017/0129182 A1 | 5/2017 | Sauti et al. |
| 2017/0129186 A1 | 5/2017 | Sauti et al. |
| 2017/0144375 A1 | 5/2017 | Waldrop et al. |
| 2017/0151728 A1 | 6/2017 | Kunc et al. |
| 2017/0157828 A1 | 6/2017 | Mandel et al. |
| 2017/0157831 A1 | 6/2017 | Mandel et al. |
| 2017/0157844 A1 | 6/2017 | Mandel et al. |
| 2017/0157851 A1 | 6/2017 | Nardiello et al. |
| 2017/0165908 A1 | 6/2017 | Pattinson et al. |
| 2017/0173868 A1 | 6/2017 | Mark |
| 2017/0182712 A1 | 6/2017 | Scribner et al. |
| 2017/0210074 A1 | 7/2017 | Ueda et al. |
| 2017/0217088 A1 | 8/2017 | Boyd et al. |
| 2017/0232674 A1 | 8/2017 | Mark |
| 2017/0259502 A1 | 9/2017 | Chapiro et al. |
| 2017/0259507 A1 | 9/2017 | Hocker |
| 2017/0266876 A1 | 9/2017 | Hocker |
| 2017/0274585 A1 | 9/2017 | Armijo et al. |
| 2017/0284876 A1 | 10/2017 | Moorlag et al. |
| 2018/0001558 A1* | 1/2018 | Taff ...................... B29C 64/118 |

FOREIGN PATENT DOCUMENTS

| | | |
|---|---|---|
| EP | 2589481 B1 | 1/2016 |
| EP | 3219474 A1 | 9/2017 |
| KR | 100995983 B1 | 11/2010 |
| KR | 101172859 B1 | 8/2012 |
| WO | 2013017284 A2 | 2/2013 |
| WO | 2016088042 A1 | 6/2016 |
| WO | 2016088048 A1 | 6/2016 |
| WO | 2016110444 A1 | 7/2016 |
| WO | 2016159259 A1 | 10/2016 |
| WO | 2016196382 A1 | 12/2016 |
| WO | 2017006178 A1 | 1/2017 |
| WO | 2017006324 A1 | 1/2017 |
| WO | 2017051202 A1 | 3/2017 |
| WO | 2017081253 A1 | 5/2017 |
| WO | 2017085649 A1 | 5/2017 |
| WO | 2017087663 A1 | 5/2017 |
| WO | 2017108758 A1 | 6/2017 |

(56) References Cited

FOREIGN PATENT DOCUMENTS

| WO | 2017122941 A1 | 7/2017 |
| WO | 2017122942 A1 | 7/2017 |
| WO | 2017122943 A1 | 7/2017 |
| WO | 2017123726 A1 | 7/2017 |
| WO | 2017124085 A1 | 7/2017 |
| WO | 2017126476 A1 | 7/2017 |
| WO | 2017126477 A1 | 7/2017 |
| WO | 2017137851 A2 | 8/2017 |
| WO | 2017142867 A1 | 8/2017 |
| WO | 2017150186 A1 | 9/2017 |

OTHER PUBLICATIONS

A. Endruweit, M. S. Johnson, & A. C. Long, Curing of Composite Components by Ultraviolet Radiation: A Review, Polymer Composites, pp. 119-128 (Apr. 2006).

C. Fragassa, & G. Minak, Standard Characterization for Mechanical Properties of Photopolymer Resins for Rapid Prototyping, 1st Symposium on Multidisciplinary Studies of Design in Mechanical Engineering, Bertinoro, Italy (Jun. 25-28, 2008).

Hyouk Ryeol Choi and Se-gon Roh, In-pipe Robot with Active Steering Capability for Moving Inside of Pipelines, Bioinspiration and Robotics: Walking and Climbing Robots, Sep. 2007, p. 544, I-Tech, Vienna, Austria.

Kenneth C. Kennedy II & Robert P. Kusy, UV-Cured Pultrusion Processing of Glass-Reinforced Polymer Composites, Journal of Vinyl and Additive Technology, vol. 1, Issue 3, pp. 182-186 (Sep. 1995).

M. Martin-Gallego et al., Epoxy-Graphene UV-Cured Nanocomposites, Polymer, vol. 52, Issue 21, pp. 4664-4669 (Sep. 2011).

P. Compston, J, Schiemer, & A. Cvetanovska, Mechanical Properties and Styrene Emission Levels of a UV-Cured Glass-Fibre/Vinylester Composite, Composite Structures, vol. 86, pp. 22-26 (Mar. 2008).

S Kumar & J.-P. Kruth, Composites by Rapid Prototyping Technology, Materials and Design, (Feb. 2009).

S. L. Fan, F. Y. C. Boey, & M. J. M. Abadie, UV Curing of a Liquid Based Bismaleimide-Containing Polymer System, eXPRESS Polymer Letters, vol. 1, No. 6, pp. 397-405 (2007).

T. M. Llewelly-Jones, Bruce W. Drinkwater, and Richard S. Trask; 3D Printed Components With Ultrasonically Arranged Microscale Structure, Smart Materials and Structures, 2016, pp. 1-6, vol. 25, IOP Publishing Ltd., UK.

Vincent J. Lopata et al., Electron-Beam-Curable Epoxy Resins for the Manufacture of High-Performance Composites, Radiation Physics and Chemistry, vol. 56, pp. 405-415 (1999).

Yugang Duan et al., Effects of Compaction and UV Exposure on Performance of Acrylate/Glass-Fiber Composites Cured Layer by Layer, Journal of Applied Polymer Science, vol. 123, Issue 6, pp. 3799-3805 (May 15, 2012).

International Search Report dated Mar. 8, 2018 for PCT/US17/68020 to CC3D LLC Filed Dec. 21, 2017.

\* cited by examiner

ADDITIVE MANUFACTURING SYSTEM HAVING FINISH-FOLLOWER

RELATED APPLICATIONS

This application is based on and claims the benefit of priority from U.S. Provisional Application No. 62/449,899 that was filed on Jan. 24, 2017, the contents of which are expressly incorporated herein by reference.

TECHNICAL FIELD

The present disclosure relates generally to a manufacturing system and, more particularly, to an additive manufacturing system having a finish-follower.

BACKGROUND

Extrusion manufacturing is a known process for producing continuous structures. During extrusion manufacturing, a liquid matrix (e.g., a thermoset resin or a heated thermoplastic) is pushed through a die having a desired cross-sectional shape and size. The material, upon exiting the die, cures and hardens into a final form. In some applications, UV light and/or ultrasonic vibrations are used to speed the cure of the liquid matrix as it exits the die. The structures produced by the extrusion manufacturing process can have any continuous length, with a straight or curved profile, a consistent cross-sectional shape, and excellent surface finish. Although extrusion manufacturing can be an efficient way to continuously manufacture structures, the resulting structures may lack the strength required for some applications.

Pultrusion manufacturing is a known process for producing high-strength structures. During pultrusion manufacturing, individual fiber strands, braids of strands, and/or woven fabrics are coated with or otherwise impregnated with a liquid matrix (e.g., a thermoset resin or a heated thermoplastic) and pulled through a stationary die where the liquid matrix cures and hardens into a final form. As with extrusion manufacturing, UV light and/or ultrasonic vibrations are used in some pultrusion applications to speed the cure of the liquid matrix as it exits the die. The structures produced by the pultrusion manufacturing process have many of the same attributes of extruded structures, as well as increased strength due to the integrated fibers. Although pultrusion manufacturing can be an efficient way to continuously manufacture high-strength structures, the resulting structures may lack the form (shape, size, and/or precision) and/or surface finish required for some applications.

The disclosed system is directed at addressing one or more of the problems set forth above and/or other problems of the prior art.

SUMMARY

In one aspect, the present disclosure is directed to a follower for an additive manufacturing system. The follower may include a matrix inlet passage, and a nozzle connected to a distal end of the matrix inlet passage. The follower may also include a cure enhancer located downstream of the nozzle, and a squeegee blade disposed between the nozzle and the cure enhancer.

In another aspect, the present disclosure is directed to an additive manufacturing system. The additive manufacturing system may include a matrix reservoir, a primary nozzle fluidly connected to the matrix reservoir, and a primary cure enhancer operatively connected to at least one of the matrix reservoir and the primary nozzle. The primary cure enhancer may be configured to direct a cure energy toward a tip of the primary nozzle. The additive manufacturing system may also include an auxiliary nozzle, an arm configured to mount the auxiliary nozzle at a trailing side of the primary nozzle, and a passage extending from the matrix reservoir to the auxiliary nozzle.

In yet another aspect, the present disclosure is directed to another additive manufacturing system. This additive manufacturing system may include a moveable support, a print head connected to the moveable support and configured to discharge a matrix-wetted reinforcement, and a follower connected to trail behind the print head. The follower may include a nozzle configured to discharge only a matrix, and a cure enhancer located at a side of the nozzle opposite the print head. The follower may also include a squeegee blade disposed between the nozzle and the cure enhancer.

DETAILED DESCRIPTION

Figure 1:
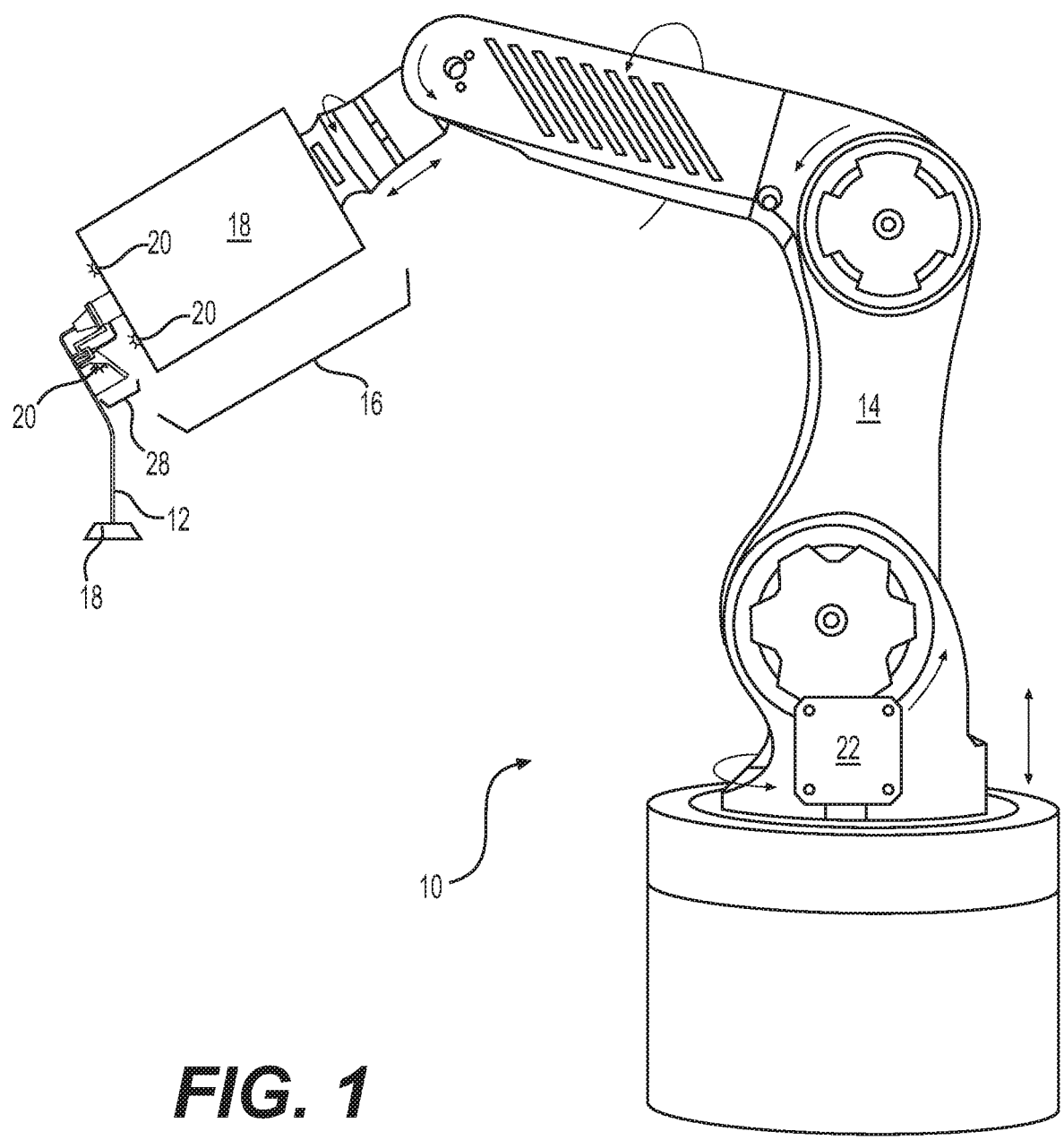
FIG. 1 is a diagrammatic illustration of an exemplary disclosed manufacturing system.

FIG. 1 illustrates an exemplary system 10, which may be used to continuously manufacture a composite structure 12 having any desired cross-sectional shape (e.g., circular, polygonal, etc.). System 10 may include at least a support 14 and a head 16. Head 16 may be coupled to and moved by support 14. In the disclosed embodiment of FIG. 1, support 14 is a robotic arm capable of moving head 16 in multiple directions during fabrication of structure 12, such that a resulting longitudinal axis of structure 12 is three-dimensional. It is contemplated, however, that support 14 could alternatively be an overhead gantry or a hybrid gantry/arm also capable of moving head 16 in multiple directions during fabrication of structure 12. Although support 14 is shown as being capable of multi-axis movements, it is contemplated that any other type of support 14 capable of moving head 16 in the same or in a different manner could also be utilized, if desired. In some embodiments, a drive may mechanically couple head 16 to support 14, and may include components that cooperate to move and/or supply power or materials to head 16.

Head 16 may be configured to receive or otherwise contain a matrix. The matrix may include any type of material (e.g., a liquid resin, such as a zero volatile organic compound resin; a powdered metal; etc.) that is curable. Exemplary matrixes include thermosets, single- or multipart epoxy resins, polyester resins, cationic epoxies, acrylated epoxies, urethanes, esters, thermoplastics, photopolymers, polyepoxides, thiols, alkenes, thiol-enes, and more. In one embodiment, the matrix inside head 16 may be pressurized, for example by an external device (e.g., an extruder or another type of pump—not shown) that is fluidly connected to head 16 via a corresponding conduit (not shown). In another embodiment, however, the matrix pressure may be generated completely inside of head 16 by a similar type of device. In yet other embodiments, the matrix may be gravity-fed through and/or mixed within head 16. In some instances, the matrix inside head 16 may need to be kept cool and/or dark to inhibit premature curing; while in other instances, the matrix may need to be kept warm for the same reason. In either situation, head 16 may be specially configured (e.g., insulated, chilled, and/or warmed) to provide for these needs.

The matrix may be used to coat, encase, or otherwise at least partially surround any number of continuous reinforcements (e.g., separate fibers, tows, rovings, ribbons, and/or sheets of material) and, together with the reinforcements, make up at least a portion (e.g., a wall) of composite structure 12. The reinforcements may be stored within (e.g., on separate internal spools—not shown) or otherwise passed through head 16 (e.g., fed from external spools). When multiple reinforcements are simultaneously used, the reinforcements may be of the same type and have the same diameter and cross-sectional shape (e.g., circular, square, flat, etc.), or of a different type with different diameters and/or cross-sectional shapes. The reinforcements may include, for example, carbon fibers, vegetable fibers, wood fibers, mineral fibers, glass fibers, metallic wires, optical tubes, etc. It should be noted that the term "reinforcement" is meant to encompass both structural and non-structural types of continuous materials that can be at least partially encased in the matrix discharging from head 16.

The reinforcements may be exposed to (e.g., coated with) the matrix while the reinforcements are inside head 16, while the reinforcements are being passed to head 16 (e.g., as a pre-preg material), and/or while the reinforcements are discharging from head 16, as desired. The matrix, dry reinforcements, and/or reinforcements that are already exposed to the matrix (e.g., wetted reinforcements) may be transported into head 16 in any manner apparent to one skilled in the art.

The matrix and reinforcement may be discharged from head 16 via at least two different modes of operation. In a first mode of operation, the matrix and reinforcement are extruded (e.g., pushed under pressure and/or mechanical force) from head 16, as head 16 is moved by support 14 to create the 3-dimensional shape of structure 12. In a second mode of operation, at least the reinforcement is pulled from head 16, such that a tensile stress is created in the reinforcement during discharge. In this mode of operation, the matrix may cling to the reinforcement and thereby also be pulled from head 16 along with the reinforcement, and/or the matrix may be discharged from head 16 under pressure along with the pulled reinforcement. In the second mode of operation, where the matrix is being pulled from head 16, the resulting tension in the reinforcement may increase a strength of structure 12, while also allowing for a greater length of unsupported material to have a straighter trajectory (i.e., the tension may act against the force of gravity to provide free-standing support for structure 12).

The reinforcement may be pulled from head 16 as a result of head 16 moving away from an anchor point 18. In particular, at the start of structure-formation, a length of matrix-impregnated reinforcement may be pulled and/or pushed from head 16, deposited onto anchor point 18, and cured, such that the discharged material adheres to anchor point 18. Thereafter, head 16 may be moved away from anchor point 18, and the relative movement may cause the reinforcement to be pulled from head 16. It should be noted that the movement of the reinforcement through head 16 could be assisted (e.g., via internal feed mechanisms), if desired. However, the discharge rate of the reinforcement from head 16 may primarily be the result of relative movement between head 16 and anchor point 18, such that tension is created within the reinforcement. It is contemplated that anchor point 18 could be moved away from head 16 instead of or in addition to head 16 being moved away from anchor point 18.

One or more cure enhancers (e.g., one or more light sources, an ultrasonic emitter, a laser, a heater, a catalyst dispenser, a microwave generator, etc.) 20 may be mounted proximate (e.g., within, on, and/or trailing from) head 16 and configured to enhance a cure rate and/or quality of the matrix as it is discharged from head 16. Cure enhancer 20 may be controlled to selectively expose internal and/or external surfaces of structure 12 to energy (e.g., light energy, electromagnetic radiation, vibrations, heat, a chemical catalyst or hardener, etc.) during the formation of structure 12. The energy may increase a rate of chemical reaction occurring within the matrix, sinter the material, harden the material, or otherwise cause the material to cure as it discharges from head 16.

A controller 22 may be provided and communicatively coupled with support 14, head 16, and any number and type of cure enhancers 20. Controller 22 may embody a single processor or multiple processors that include a means for controlling an operation of system 10. Controller 22 may include one or more general- or special-purpose processors or microprocessors. Controller 22 may further include or be associated with a memory for storing data such as, for example, design limits, performance characteristics, operational instructions, matrix characteristics, reinforcement characteristics, characteristics of structure 12, and corresponding parameters of each component of system 10. Various other known circuits may be associated with controller 22, including power supply circuitry, signal-conditioning circuitry, solenoid/motor driver circuitry, communication circuitry, and other appropriate circuitry. Moreover, controller 22 may be capable of communicating with other components of system 10 via wired and/or wireless transmission.

One or more maps may be stored in the memory of controller 22 and used during fabrication of structure 12. Each of these maps may include a collection of data in the form of models, lookup tables, graphs, and/or equations. In the disclosed embodiment, the maps are used by controller 22 to determine desired characteristics of cure enhancers 20, the associated matrix, and/or the associated reinforcements at different locations within structure 12. The characteristics may include, among others, a type, quantity, and/or configuration of reinforcement and/or matrix to be discharged at a particular location within structure 12, and/or an amount, intensity, shape, and/or location of desired curing. Controller 22 may then correlate operation of support 14 (e.g., the location and/or orientation of head 16) and/or the discharge of material from head 16 (a type of material, desired performance of the material, cross-linking requirements of the material, a discharge rate, etc.) with the operation of cure enhancers 20, such that structure 12 is produced in a desired manner.

Figure 2:
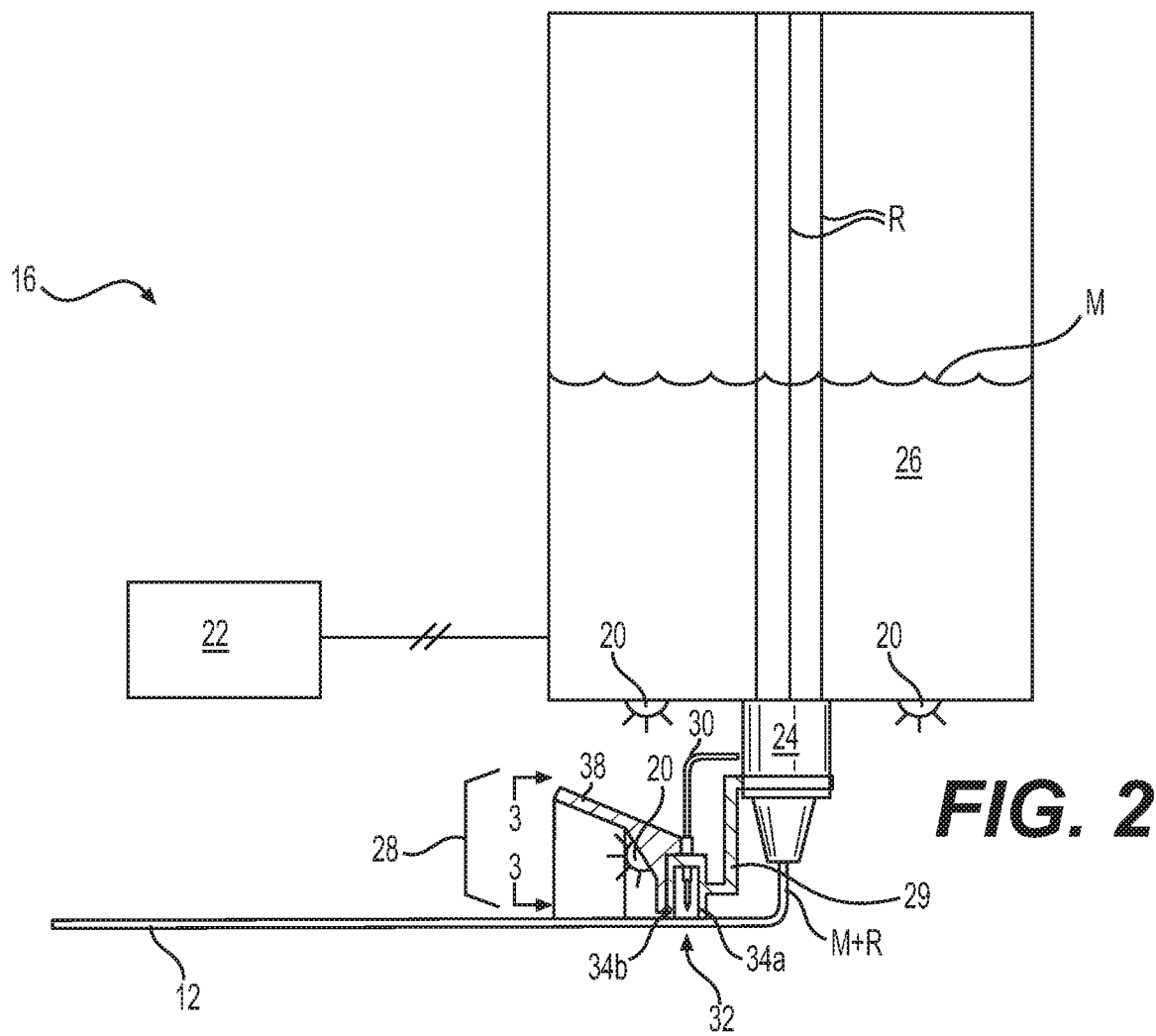
FIG. 2 is a diagrammatic illustration of an exemplary disclosed head that may be utilized with the manufacturing system of FIG. 1.

An exemplary head 16 is disclosed in detail in FIG. 2. Head 16 may include, among other things, one or more nozzles 24 that are fluidly connected to the lower end of a matrix reservoir 26. Any number of reinforcements (represented as R in FIG. 2) may be received at an opposing upper end of reservoir 26, passed axially through reservoir 26 where at least some matrix-impregnation occurs (matrix represented as M in FIG. 2), and discharged from head 16 via any number of separate nozzles 24. In the disclosed embodiment, a single primary nozzle 24 is utilized that has a straight axial or convergent tip. In multi-nozzle applications, however, it may be helpful for a tip of each primary nozzle 24 to have a divergent shape to facilitate coalescing of the different matrix-coated fibers into a ribbon or sheet of composite material.

Figure 3:
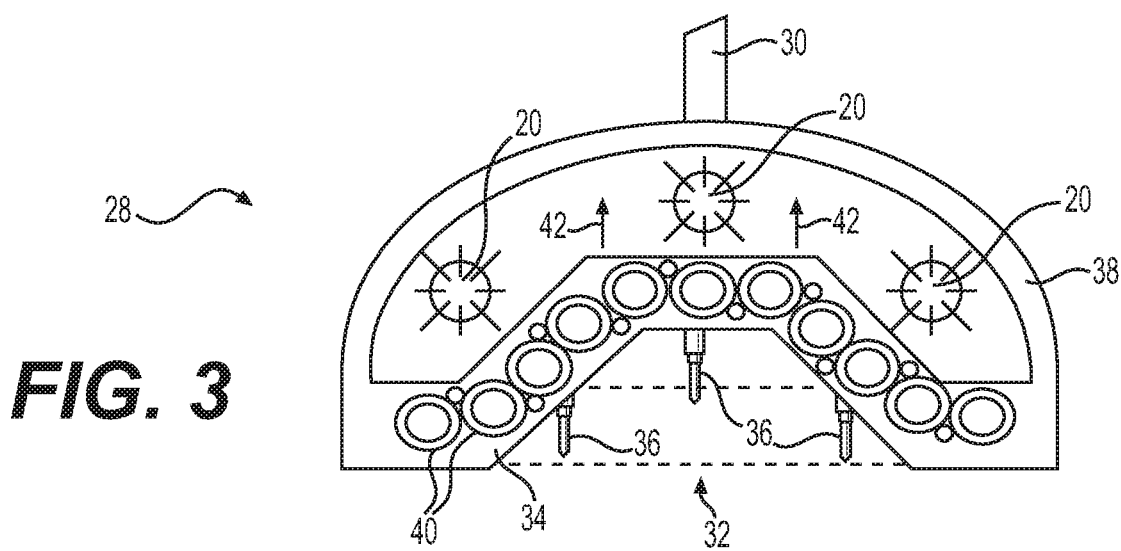
FIG. 3 is a diagrammatic illustration of an exemplary disclosed follower that may be used in conjunction with the head of FIG. 2.

As shown in FIGS. 2 and 3, head 16 may include a follower 28 connected to a trailing side of head 16 (e.g., a trailing side of primary nozzle 24) by way of a pivoting arm 29. Follower 28 may be an assembly of components that cooperate to create desired surface textures on structure 12. These components may include, among other things, a passage 30 fluidly connected with matrix reservoir 26 (e.g., via primary nozzle 24), and at least one auxiliary nozzle 32 operatively connected to a distal end of passage 30. Passage 30 may be internally provided with matrix from head 16 (and/or a different matrix from another source); and auxiliary nozzle(s) 32 may be configured to discharge the matrix toward structure 12, such that the matrix fills voids within and/or sticks to external surfaces of structure 12. A squeegee 34 may be associated with auxiliary nozzle(s) 32 and configured to wipe over and thereby smooth out the matrix after discharge from auxiliary nozzle(s) 32 and prior to curing by one or more downstream cure enhancers 20.

Auxiliary nozzle(s) 32 may be configured to apply an outer annular layer or film of matrix to external surfaces of structure 12. For example, each auxiliary nozzle 32 may include one or more orifices 36 located between upstream and downstream blades 34a, 34b of squeegee 34 that are configured to spray or otherwise discharge matrix onto the external surfaces of structure 12. Downstream blade 34b may be spaced away from the external surfaces of structure 12 by a desired distance, and configured to wipe over the matrix applied by orifices 36, thereby pressing the matrix into a smooth layer having a desired and relatively constant thickness (e.g., constant within engineering tolerances). Upstream blade 34a may ride along the outer surface of structure 12 (e.g., in direct or near-direct contact) and be configured to inhibit the matrix from passing to locations further upstream. Upstream blade 34a may be omitted in some embodiments. One or both of upstream and downstream blades 34a, b of squeegee 34 may be position-adjustable, if desired.

As described above, head 16 may include cure enhancers 20 that function to at least partially cure the composite material as it discharges from primary nozzle 24. In the disclosed embodiment, these cure enhancers 20 are mounted directly to the tip-end of head 16 (e.g., to a lower external surface of matrix reservoir 26. And as also described above, additional downstream cure enhancers 20 may be associated with follower 28 to at least partially cure the additional matrix being applied to structure 12 by auxiliary nozzle(s) 32. These cure enhancers 20 may be mounted within a hood 38 of follower 28. Hood 38 may flare outward and extend downstream to reflect energy from the additional downstream cure enhancers 20 inward toward structure 12.

As shown in FIG. 3, auxiliary nozzle(s) 32 of follower 28 may include unique features that cooperate to accommodate multi-dimensional print surfaces and/or to produce multi-faceted structures 12. For example, orifices 36 of auxiliary nozzle(s) 32 may be connected to each other by way of a plurality of hinges 40, which allow orifices 36 to be moved out of a straight-line relationship. In particular, hinges 40 may allow for pivoting, raising, and/or lowering orifices 36 relative to each other. When head 16 travels axially relative to a print surface (see, for example, FIG. 2) of structure 12, the raising/lowering of orifices 36 may allow for fabrication of a C-, V-, and/or S-shaped cross-sections in an outer matrix shell of structure 12.

One or more actuators 42 (e.g., linear and/or rotary actuators) may be associated with hinges 40 and configured to automatically make adjustments to the arrangement of orifices 36 when selectively energized by controller 22. These adjustments may include relative pivoting of hinges 40 and the resulting raising and lowering of orifices 36, as desired. For example, controller 22 may selectively energize one or more actuators 42 based on specifications for structure 12 that are stored in memory and/or in coordination with movements of head 16 caused by support 14. In one embodiment, the adjustments may be implemented to create particular facets of structure 12. In another embodiment, the adjustments may be implemented to discharge material on top of an irregular print surface.

It is contemplated that auxiliary nozzle(s) 32 may additionally or alternatively be moveable based only on inter-action with a print surface (e.g., without the use of any actuators 42), if desired. For example, orifices 36 may be biased (e.g., via a spring or hydraulic pressure) to a baseline position, and moveable away from the baseline position when printing over an uneven surface.

In one embodiment, squeegee 34 of FIG. 3 includes a flexible outer membrane that surrounds orifices 36. The membrane may be filled with a smart fluid (e.g., a magnetorheological fluid) that, when energized (e.g., when exposed to a magnetic field or a voltage potential), increases in viscosity and can even become a solid. Controller 22 may selectively de-energize the fluid to relax the membrane during movements of actuator(s) 42, and thereafter re-energize the fluid such that the membrane again becomes rigid in the new configuration caused by the movement of actuator(s) 42. In this manner, the membrane may help to provide consistent contour control during fabrication of structure 12.

It is contemplated that additional functionality could be included within follower 28, if desired. For example, a vibration and/or oscillation inducing member (not shown) could be embedded within and/or near follower 28. This member may be functional to reduce bubbles and/or help to spread out the matrix discharged by primary and/or auxiliary nozzles 24, 32.

INDUSTRIAL APPLICABILITY

The disclosed system may be used to continuously manufacture composite structures having any desired cross-sectional size, shape, length, density, and/or strength. The composite structures may include any number of different reinforcements of the same or different types, diameters, shapes, configurations, and consists, each coated with a common matrix. In addition, the disclosed head and follower may allow cooperative fabrication of complex structures with high-tolerance surface finish specifications. Operation of system 10 will now be described in detail.

At a start of a manufacturing event, information regarding a desired structure 12 may be loaded into system 10 (e.g., into controller 22 that is responsible for regulating operations of support 14 and/or head 16). This information may include, among other things, a size (e.g., diameter, wall thickness, length, etc.), a contour (e.g., a trajectory), surface features (e.g., ridge size, location, thickness, length; flange size, location, thickness, length; etc.) and finishes, connection geometry (e.g., locations and sizes of couplings, tees, splices, etc.), location-specific matrix stipulations, location-specific reinforcement stipulations, etc. It should be noted that this information may alternatively or additionally be loaded into system 10 at different times and/or continuously during the manufacturing event, if desired. Based on the component information, one or more different reinforcements and/or matrixes may be selectively installed and/or continuously supplied into system 10.

Installation of the reinforcements may be performed by passing the reinforcements down through matrix reservoir 26, and then threading the reinforcements through any nozzles 24 that exist. Installation of the matrix may include filling reservoir 26 within head 16 and/or coupling of an extruder (not shown) to head 16.

Head 16 may then be moved by support 14 under the regulation of controller 22 to cause matrix-coated reinforcements to be placed against or on a corresponding anchor point 18. Cure enhancers 20 within head 16 and/or follower 28 may then be selectively activated to cause hardening of the matrix surrounding the reinforcements, thereby bonding the reinforcements to anchor point 18.

The component information may then be used to control operation of system 10. For example, the reinforcements may be pulled and/or pushed from head 16 (along with the matrix), while support 14 selectively moves head 16 in a desired manner during curing, such that an axis of the resulting structure 12 follows a desired trajectory (e.g., a free-space, unsupported, 3-D trajectory). As the separate reinforcements are pulled through head 16, the reinforcements may pass through primary nozzle(s) 24 and under or through follower 28. Auxiliary nozzles 32, the downstream cure enhancers 20, actuator(s) 42, and/or the smart fluid within the membrane of squeegee 34 may be selectively energized by controller 22, such that an outer layer or skin having a desired surface finish and contour is applied to structure 12 and cured. Once structure 12 has grown to a desired length, structure 12 may be disconnected (e.g., severed) from head 16 in any desired manner.

It will be apparent to those skilled in the art that various modifications and variations can be made to the disclosed systems and head. Other embodiments will be apparent to those skilled in the art from consideration of the specification and practice of the disclosed systems and heads. It is intended that the specification and examples be considered as exemplary only, with a true scope being indicated by the following claims and their equivalents.

What is claimed is:

1. A follower for an additive manufacturing system having a print head, the follower comprising:
a matrix inlet passage;
a nozzle connected to a distal end of the matrix inlet passage;
a pivoting arm configured to connect the nozzle to a trailing side of the print head and to pivot relative to the print head;
a cure enhancer mounted to the arm at a location downstream of the nozzle; and
a squeegee blade mounted to the arm at a location between the nozzle and the cure enhancer, the squeegee blade being generally aligned with a central axis of the nozzle wherein the pivoting arm is configured to pivot the nozzle, cure enhancer and squeegee blade relative to the print head.

2. The follower of claim 1, wherein:
the squeegee blade is a first blade; and
the follower further includes a second blade disposed upstream of the nozzle.

3. The follower of claim 1, wherein the squeegee blade includes:
a flexible outer membrane; and
a smart fluid disposed within the flexible outer membrane.

4. The follower of claim 1, wherein the nozzle includes a plurality of orifices.

5. The follower of claim 4, wherein the plurality of orifices are connected together in a chain by way of at least one hinge.

6. The follower of claim 5, further including an actuator configured to move the chain.

7. The follower of claim 1, further including a hood that flares outward around the cure enhancer.

8. The follower of claim 2, wherein:
the first blade is positioned a first distance above material discharged from the print head; and
the second blade is positioned a second distance above the material that is greater than the first distance.

9. The follower of claim 1, wherein the squeegee blade is flat, resilient, and oriented in general alignment with a central axis of the nozzle.

10. An additive manufacturing system, comprising:
a matrix reservoir;
a primary nozzle fluidly connected to the matrix reservoir;
a primary cure enhancer operatively connected to at least one of the matrix reservoir and the primary nozzle, the primary cure enhancer configured to expose material discharging from a tip of the primary nozzle to light after discharge;
a follower comprising:
a pivoting arm;
an auxiliary nozzle mounted to the arm;
a passage extending from the matrix reservoir to the auxiliary nozzle;
an auxiliary cure enhancer mounted to the arm at a location downstream of the auxiliary nozzle; and
a squeegee blade mounted to the arm at a location between the auxiliary nozzle and the auxiliary cure enhancer;
wherein the pivoting arm is configured to pivot the auxiliary nozzle, auxiliary cure enhancer, and squeegee blade relative to the primary nozzle.

11. The additive manufacturing system of claim 10, wherein:
the squeegee blade is a first blade; and
the additive manufacturing system further includes a second blade disposed upstream of the auxiliary nozzle.

12. The additive manufacturing system of claim 10, wherein the squeegee blade includes:
a flexible outer membrane; and
a smart fluid disposed within the flexible outer membrane.

13. The additive manufacturing system of claim 10, further including a hood mounted to the arm that flares outward around the auxiliary cure enhancer at a downstream side of the primary nozzle and moves together with the auxiliary cure enhancer.

14. The additive manufacturing system of claim 10, wherein the auxiliary nozzle includes a plurality of orifices.

15. The additive manufacturing system of claim 14, wherein the plurality of orifices are connected together in a chain by way of at least one hinge.

16. The additive manufacturing system of claim 15, further including an actuator configured to move the chain.

17. The additive manufacturing system of claim 10, wherein:
the primary nozzle is configured to discharge a matrix-wetted reinforcement; and the auxiliary nozzle is configured to discharge only a matrix.

18. An additive manufacturing system, comprising:
a moveable support;
a print head connected to the moveable support and configured to discharge a matrix-wetted reinforcement; and
a follower connected to trail behind the print head and to pivot relative to the print head by way of an arm, the follower including:
  nozzle mounted to the arm and configured to discharge only a matrix;
  a cure enhancer mounted to the arm at a side of the nozzle opposite the print head and configured to expose the matrix to light after discharge from the nozzle; and
  a squeegee blade mounted to the arm at a location between the nozzle and the cure enhancer wherein the pivoting arm is configured to pivot the nozzle, cure enhancer and squeegee blade relative to the print head.

* * * * *